(12) United States Patent
Choi et al.

(10) Patent No.: US 11,942,667 B2
(45) Date of Patent: Mar. 26, 2024

(54) FUEL CELL SYSTEM AND CONTROL METHOD USING SAME

(71) Applicant: HYUNDAI MOBIS CO., LTD., Seoul (KR)

(72) Inventors: Sung Kyung Choi, Yongin-si (KR); Jong Bo Won, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 103 days.

(21) Appl. No.: 17/666,715

(22) Filed: Feb. 8, 2022

(65) Prior Publication Data

US 2023/0155145 A1 May 18, 2023

(30) Foreign Application Priority Data

Nov. 18, 2021 (KR) .................. 10-2021-0159652

(51) Int. Cl.
| | |
|---|---|
| H01M 8/04029 | (2016.01) |
| B64C 39/02 | (2023.01) |
| B64U 30/20 | (2023.01) |
| B64U 50/19 | (2023.01) |
| H01M 8/0432 | (2016.01) |
| H01M 8/04746 | (2016.01) |
| B64U 10/13 | (2023.01) |

(52) U.S. Cl.
CPC ....... *H01M 8/04029* (2013.01); *B64C 39/024* (2013.01); *H01M 8/04358* (2013.01); *H01M 8/04768* (2013.01); *B64U 10/13* (2023.01); *B64U 30/20* (2023.01); *B64U 50/19* (2023.01); *H01M 2250/20* (2013.01)

(58) Field of Classification Search
CPC ......... H01M 8/04029; H01M 8/04358; H01M 8/04768; H01M 8/04014; B64U 30/20; B64U 50/19; B64D 33/10
See application file for complete search history.

(56) References Cited

U.S. PATENT DOCUMENTS

| | | | |
|---|---|---|---|
| 2016/0129808 A1* | 5/2016 | Bono | H01M 8/04044 |
| | | | 429/435 |
| 2022/0055762 A1* | 2/2022 | Clarke | H01M 8/04029 |

FOREIGN PATENT DOCUMENTS

| | | |
|---|---|---|
| JP | 2002-193193 A | 7/2002 |
| JP | 2012-52503 A | 3/2012 |
| JP | 2018-141373 A | 9/2018 |
| JP | 2018-176920 A | 11/2018 |

OTHER PUBLICATIONS

Korean Office Action dated Mar. 10, 2023, in counterpart Korean Patent Application No. 10-2021-0159652 (6 pages in Korean).

* cited by examiner

*Primary Examiner* — Stewart A Fraser
(74) *Attorney, Agent, or Firm* — NSIP Law (57) ABSTRACT

A fuel cell system and a control method using the same. The fuel cell system includes a propeller wing of a flying object and connected to a rotor, a main radiator and a sub-radiator arranged so that heat of cooling water is dissipated by a downdraft generated by rotation of the propeller wing, and a controller to provide the cooling water to one or both of the main radiator and the sub-radiator based on an operation mode of the flying object.

10 Claims, 5 Drawing Sheets

FUEL CELL SYSTEM AND CONTROL METHOD USING SAME

CROSS-REFERENCE TO RELATED APPLICATION

This application claims the benefit of priority to Korean Patent Application No. 10-2021-0159652, filed in the Korean Intellectual Property Office on Nov. 18, 2021, the entire contents of which are incorporated herein by reference.

TECHNICAL FIELD

The present disclosure relates to a fuel cell system used in a flying object and a control method using the same.

BACKGROUND

Fuel cells are high-efficiency clean energy sources, and usage regions thereof are gradually expanding. Among various types of the fuel cells, in particular, polymer electrolyte membrane fuel cells (PEMFCs) are operated even at a lower temperature than those other types of fuel cells, have short start-up times, and have fast response characteristics to a load change.

Further, the PEMFCs have high efficiency, high current density, and high power density. The PEMFCs are less sensitive to a change in the pressure of a reactive gas (hydrogen and oxygen in air) and may generate a wide range of outputs. For this reason, the PEMFCs may be applied in various fields such as power sources of pollution-free vehicles, self-generation power sources, mobile power sources, and military power sources.

Meanwhile, to obtain a required potential in an actual vehicle or a drone, unit cells should be stacked as many as the required potential, and a component in which the unit cells are stacked in this way is called a stack (or a fuel cell stack). The potential generated in one unit cell is about 1.2 V, and power required for a load is supplied by stacking a number of cells in series.

Each unit cell includes a membrane electrode assembly (MEA), and in the MEA, an anode electrode to which hydrogen is supplied and a cathode electrode to which air (oxygen) is supplied are provided on both sides with a polymer electrolyte membrane interposed therebetween through which hydrogen ions are transmitted. Further, a component in which a gas diffusion layer is disposed outside the anode electrode and the cathode electrode including a catalyst layer, and the MEA and a separator having a reaction gas and cooling water flow path formed therein are sequentially stacked is called a fuel cell stack.

Since a fuel cell system generates electrical energy and generates heat as a reaction byproduct thereof, a device for cooling the stack is essential to prevent an increase in the temperature of the stack.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a fuel cell system includes a propeller wing of a flying object and connected to a rotor, a main radiator and a sub-radiator arranged so that heat of cooling water is dissipated by a downdraft generated by rotation of the propeller wing, and a controller to provide the cooling water one or both of the main radiator and the sub-radiator based on an operation mode of the flying object.

The operation mode of the flying object may include an initial start mode, an emergency operation mode, a normal operation mode, and a maximum output mode, and the controller may provide the cooling water to the main radiator in the initial start mode and the emergency operation mode, provide the cooling water to the sub-radiator in the normal operation mode, and provide the cooling water to the main radiator and the sub-radiator in the maximum output mode.

The fuel cell system may further include a first cooling water valve that transmits the cooling water to the main radiator or blocks the cooling water from being transmitted to the main radiator, and a second cooling water valve that transmits the cooling water to the sub-radiator or blocks the cooling water from being transmitted to the sub-radiator.

The controller may switch the first cooling water valve to an open state and switch the second cooling water valve to a closed state in the initial start mode and the emergency operation mode.

The controller may switch the first cooling water valve to a closed state and switch the second cooling water valve to an open state in the normal operation mode.

The controller may switch the first cooling water valve and the second cooling water valve to an open state in the maximum output mode.

The fuel cell system may further include a cooling water pump that allows the cooling water to circulate, and the controller may control a number of rotations of the cooling water pump based on an outside air temperature.

The controller may increase the number of rotations of the cooling water pump as the outside air temperature increases and decrease the number of rotations of the cooling water pump as the outside air temperature decreases.

The cooling water may circulate in one or both of the main radiator and the sub-radiator through a temperature control valve, a stack cooling water pump, a bypass valve, and a fuel cell stack.

The cooling water may circulate in one or both of the main radiator or the sub-radiator through a stack cooling water pump, a fuel cell stack, and a flow path switching valve.

In another general aspect, a method of controlling a fuel cell system includes: dissipating heat of cooling water through a main radiator when a flying object is initially started; selecting an operation mode among an emergency operation mode, a normal operation mode, and a maximum output operation mode of the flying object; and selectively dissipating the heat of the cooling water through one or both of the main radiator and a sub-radiator according to the operation mode.

The main radiator and the sub-radiator may be arranged so that the heat of the cooling water is dissipated by a downdraft generated by rotation of a propeller of the flying object.

Dissipating the heat of the cooling water through one or both of the main radiator and the sub-radiator according to the operation mode may include dissipating the heat of the cooling water through the main radiator in a case in which the emergency operation mode is selected, dissipating the heat of the cooling water through the sub-radiator in a case in which the normal operation mode is selected, and dissipating the heat of the cooling water through the main radiator and the sub-radiator in a case in which the maximum output operation mode is selected.

The method may further include determining whether an operation of the flying object is terminated after dissipating the heat of the cooling water through one or both of the main radiator and the sub-radiator according to the operation mode.

In the determining of whether the operation of the flying object is terminated, in a case in which it is determined that the operation of the flying object is not terminated, the selecting of an operation mode among the emergency operation mode, the normal operation mode, and the maximum output operation mode of the flying object may be repeated.

In another general aspect, a method of controlling a fuel cell system includes setting an initial number of rotations of a cooling water pump according to an operation mode of a flying object, determining whether a temperature of cooling water is higher than a target temperature, determining whether a difference between the temperature of the cooling water and the target temperature is within a preset temperature difference in a case in which the temperature of the cooling water is higher than the target temperature, and increasing the number of rotations of the cooling water pump in a case in which the difference between the temperature of the cooling water and the target temperature is greater than the preset temperature difference.

The method may further include decreasing the number of rotations of the cooling water pump in a case in which the temperature of the cooling water is lower than the target temperature, and the difference between the temperature of the cooling water and the target temperature is greater than the preset temperature difference.

The method may further include resetting the initial number of rotations of the cooling water pump based on an outside air temperature.

The resetting of the initial number of rotations of the cooling water pump based on the outside air temperature may include maintaining a currently set initial number of rotations of the cooling water pump in a case in which the outside air temperature is within a currently set application range, and selecting a set application range according to the outside air temperature in a case in which the outside air temperature deviates from the currently set application range, and resetting the initial number of rotations of the cooling water pump according to the selected application range.

Other features and aspects will be apparent from the following detailed description, the drawings, and the claims.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. It should be noted that when components in the drawings are designated by reference numerals, the same components have the same reference numerals as far as possible even though the components are illustrated in different drawings. Further, in description of the embodiments of the present disclosure, when it is determined that a detailed description of a related well-known configuration or function disturbs understanding of the embodiments of the present disclosure, the detailed description will be omitted.

In the description of components of the embodiments of the present disclosure, the terms such as first, second, A, B, (a) and (b) may be used. These terms are not used to delimit an essence, an order or sequence, and the like of a corresponding component but used merely to distinguish the corresponding component from other component(s). Further, unless otherwise defined, all terms used herein including technical or scientific terms have the same meanings as those commonly understood by those skilled in the art to which the present disclosure belongs. The terms defined in the generally used dictionaries should be construed as having the meanings that coincide with the meanings of the contexts of the related technologies, and should not be construed as ideal or excessively formal meanings unless clearly defined in the present application.

Hereinafter, embodiments of the present disclosure will be described in detail with reference to FIGS. 1 to 5.

Figure 1:
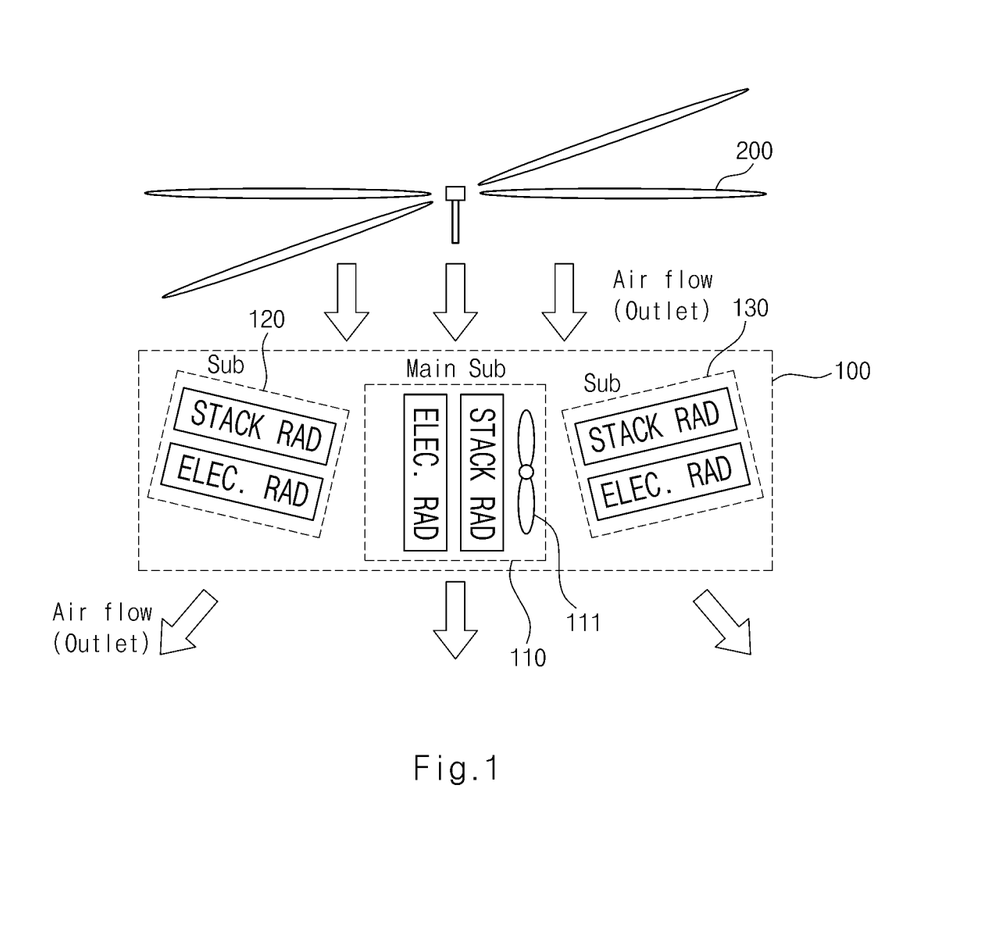
FIG. 1 is a view illustrating a configuration of a flying object to which a fuel cell system is applied according to an embodiment of the present disclosure.

FIG. 1 is a view illustrating a configuration of a flying object to which a fuel cell system is applied according to an embodiment of the present disclosure.

Referring to FIG. 1, the flying object to which the fuel cell system is applied may have a configuration in which radiators 110, 120, and 130 are arranged so that a downdraft (wind power) generated from a propeller wing 200 according to rotation of a rotor for flight of the flying object passes through the radiators 110, 120, and 130 of a fuel cell system 100.

In this case, it is illustrated in FIG. 1 that the radiators 110, 120, and 130 include the main radiator 110 and the two sub-radiators 120 and 130, but the number of the main radiator 110 and the number of the sub-radiators 120 and 130 are not limited.

The main radiator 110 may include a cooling fan 111.

In this case, the cooling fan 111 may be disposed to be perpendicular to a direction of the downdraft so as not to rotate due to the downdraft generated by the propeller wing 200.

Figure 2:
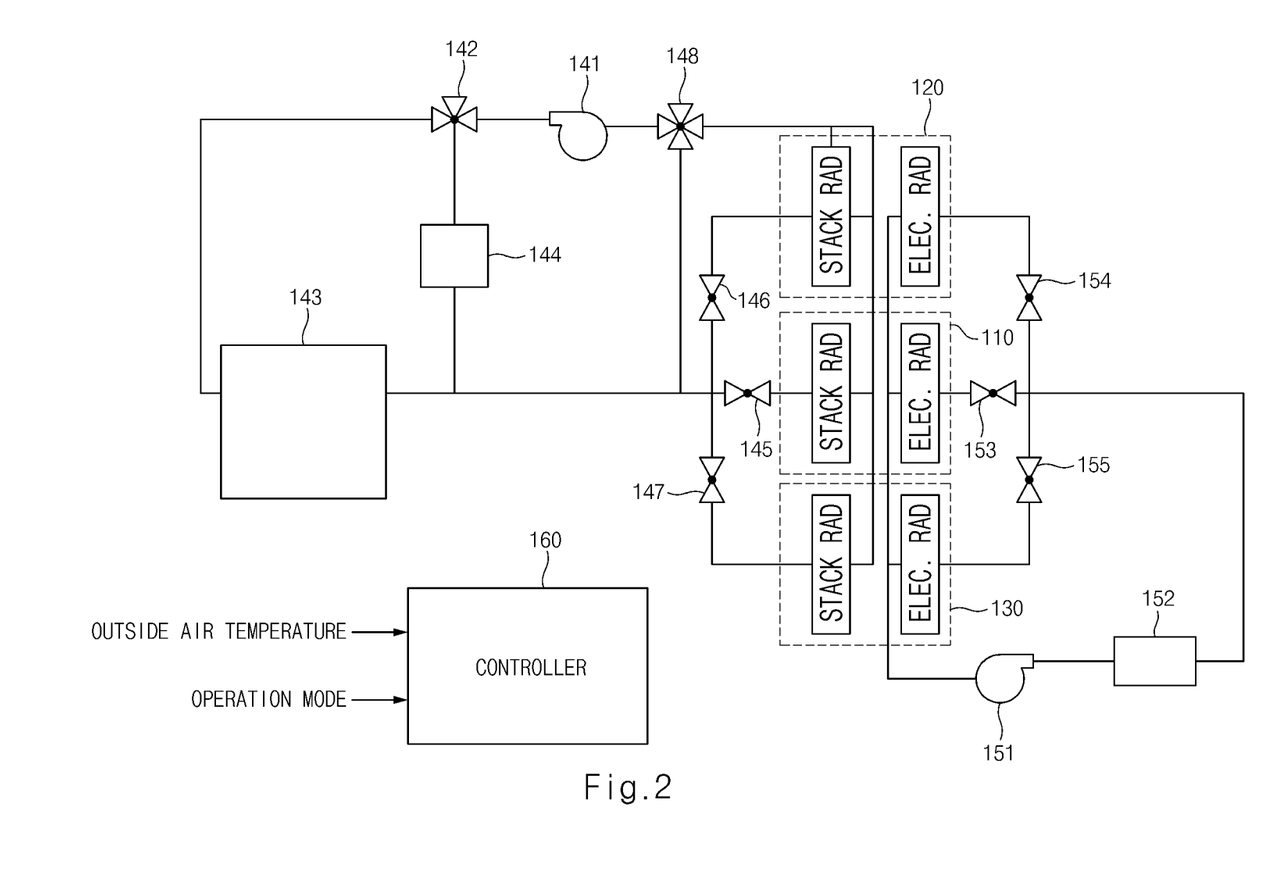
FIG. 2 is a view illustrating a configuration of the fuel cell system according to the embodiment of the present disclosure.

Further, each of the main radiator 110 and the sub-radiators 120 and 130 may include a stack radiator STACK RAD for dissipating heat generated in a fuel cell stack 143 (see FIG. 2) and an electric component radiator ELEC RAD for dissipating heat generated in an electric component 152 (see FIG. 2).

As illustrated in FIG. 1, the fuel cell system applied to the flying object according to the embodiment of the present disclosure may include the main radiator 110 and the sub-radiators 120 and 130 for dissipating heat using the downdraft generated in the propeller wing 200 for the flight of the flying object.

Further, the main radiator 110 and the sub-radiators 120 and 130 may be classified according to the presence or absence of the cooling fan 111.

In this case, the cooling fan 111 may be disposed in the main radiator 110 in a direction perpendicular to the direction of the downdraft so as not to rotate due to the downdraft generated in the propeller wing 200.

FIG. 2 is a view illustrating a configuration of the fuel cell system according to the embodiment of the present disclosure.

Referring to FIG. 2, the fuel cell system 100 may include the main radiator 110, the first sub-radiator 120, the second sub-radiator 130, a stack cooling water pump 141, a bypass valve 142, the fuel cell stack 143, a heater 144, first to third stack cooling water valves 145, 146, and 147, a temperature control valve 148, an electric component cooling water pump 151, the electric component 152, first to third electric component cooling water valves 153, 154, and 155, and a controller 160.

The main radiator 110 may include the stack radiator STACK RAD, the electric component radiator ELEC RAD, and the cooling fan 111.

The stack radiator STACK RAD included in the main radiator 110 may discharge heat of cooling water introduced through the first stack cooling water valve 145 to the outside air.

The electric component radiator ELEC RAD included in the main radiator 110 may discharge heat of cooling water introduced through the first electric component cooling water valve 153 to the outside air.

The cooling fan 111 may supply external air to the stack radiator STACK RAD and the electric component radiator ELEC RAD of the main radiator 110.

In this case, the cooling fan 111 may rotate under control of the controller 160 and may supply the external air to the main radiator 110 during the rotation.

The first sub-radiator 120 may include the stack radiator STACK RAD and the electric component radiator ELEC RAD.

The stack radiator STACK RAD of the first sub-radiator 120 may discharge heat of cooling water introduced through the second stack cooling water valve 146 to the outside air.

The electric component radiator ELEC RAD of the first sub-radiator 120 may discharge heat of cooling water introduced through the second electric component cooling water valve 154 to the outside air.

The second sub-radiator 130 may include the stack radiator STACK RAD and the electric component radiator ELEC RAD.

The stack radiator STACK RAD of the second sub-radiator 130 may discharge heat of cooling water introduced through the third stack cooling water valve 147 to the outside air.

The electric component radiator ELEC RAD of the second sub-radiator 130 may discharge heat of cooling water introduced through the third electric component cooling water valve 155 to the outside air.

In this case, the cooling water passing through the stack radiator STACK RAD of the main radiator 110, the stack radiator STACK RAD of the first sub-radiator 120, and the stack radiator STACK RAD of the second sub-radiator 130 may be introduced into the temperature control valve 148.

Further, the cooling water passing through the electric component radiator ELEC RAD of the main radiator 110, the electric component radiator ELEC RAD of the first sub-radiator 120, and the electric component radiator ELEC RAD of the second sub-radiator 130 may be introduced into the electric component cooling water pump 151.

The temperature control valve 148 may receive the cooling water passing through only the fuel cell stack 143 or the cooling water passing through the fuel cell stack 143 and the stack radiators STACK RAD of the main radiator 110 and the first and second sub-radiators 120 and 130.

The temperature control valve 148 may control the temperature of the cooling water provided to the stack cooling water pump 141 by controlling the amount of the cooling water introduced through only the fuel cell stack 143 and the amount of the cooling water passing through the stack radiators STACK RAD of the main radiator 110 and the first and second sub-radiators 120 and 130 under the control of the controller 160.

That is, the temperature control valve 148 may provide, to the stack cooling water pump 141, the cooling water introduced from a flow path passing through only the fuel cell stack 143 and the cooling water introduced from a flow path passing through the fuel cell stack 143 and the stack radiators STACK RAD of the main radiator 110 and the first and second sub-radiators 120 and 130.

To dissipate the heat generated in the fuel cell stack 143, the stack cooling water pump 141 may circulate the cooling water passing through the bypass valve 142, the fuel cell stack 143, the heater 144, the stack radiator STACK RAD of the main radiator 110, the stack radiators STACK RAD of the first and second sub-radiators 120 and 130, and the temperature control valve 148.

The number of rotations of the stack cooling water pump 141 may be controlled under the control of the controller 160, and a circulation speed of the cooling water may be increased or decreased on the basis of the number of rotations according to the control of the controller 160.

The bypass valve 142 may transmit the cooling water provided from the stack cooling water pump 141 to the fuel cell stack 143 or the heater 144 according to the control of the controller 160.

When the cooling water is provided from the bypass valve 142, the heater 144 may increase the temperature of the cooling water according to the control of the controller 160.

The first stack cooling water valve 145 may transmit the cooling water to the stack radiator STACK RAD of the main radiator 110 or may block the cooling water from being transmitted to the stack radiator STACK RAD of the main radiator 110, according to the control of the controller 160.

The second stack cooling water valve 146 may transmit the cooling water to the stack radiator STACK RAD of the first sub-radiator 120 or may block the cooling water from being transmitted to the stack radiator STACK RAD of the first sub-radiator 120, according to the control of the controller 160.

The third stack cooling water valve 147 may transmit the cooling water to the stack radiator STACK RAD of the second sub-radiator 130 or may block the cooling water from being transmitted to the stack radiator STACK RAD of the second sub-radiator 130 according to the control of the controller 160.

To dissipate the heat generated in the electric component 152, the electric component cooling water pump 151 may allow the cooling water to circulate to the electric component radiator ELEC RAD of the main radiator 110.

The number of rotations of the electric component cooling water pump 151 may be controlled according to the control of the controller 160, and the circulation speed of the cooling water for dissipating the heat generated in the electric component 152 may be increased or decreased on the basis of the number of rotations according to the control of the controller 160.

The first electric component cooling water valve 153 may transmit the cooling water to the electric component radiator ELEC RAD of the main radiator 110 or may block the cooling water from being transmitted to the electric component radiator ELEC RAD of the main radiator 110, according to the control of the controller 160.

The second electric component cooling water valve 154 may transmit the cooling water to the electric component radiator ELEC RAD of the first sub-radiator 120 or may block the cooling water from being transmitted to the electric component radiator ELEC RAD of the first sub-radiator 120, according to the control of the controller 160.

The third electric component cooling water valve 155 may transmit the cooling water to the electric component radiator ELEC RAD of the second sub-radiator 130 or may block the cooling water from being transmitted to the electric component radiator ELEC RAD of the second sub-radiator 130, according to the control of the controller 160.

The electric component radiator ELEC RAD of the main radiator 110 may discharge the heat of the cooling water transmitted through the first electric component cooling water valve 153 to the outside air.

The electric component radiator ELEC RAD of the first sub-radiator 120 may discharge the heat of the cooling water transmitted through the second electric component cooling water valve 154 to the outside air.

The electric component radiator ELEC RAD of the second sub-radiator 130 may discharge the heat of the cooling water transmitted through the third electric component cooling water valve 155 to the outside air.

In this case, the cooling water of which the heat is dissipated through the electric component radiator ELEC RAD of the main radiator 110, the electric component radiator ELEC RAD of the first sub-radiator 120, and the electric component radiator ELEC RAD of the second sub-radiator 130 may be introduced into the electric component cooling water pump 151.

The controller 160 may control the first to third stack cooling water valves 145, 146, and 147, the first to third electric component cooling water valves 153, 154, and 155, the stack cooling water pump 141, and the electric component cooling water pump 151 on the basis of the temperature of the outside air and an operation mode of the flying object.

For example, the controller 160 may control the number of rotations of each of the stack cooling water pump 141 and the electric component cooling water pump 151 on the basis of the temperature of the outside air and the operation mode of the flying object.

Further, the controller 160 may switch the first to third stack cooling water valves 145, 146, and 147 and the first to third electric component cooling water valves 153, 154, and 155 to an open state or a closed state on the basis of the operation mode of the flying object.

In more detail, the controller 160 may determine the range of the number of rotations according to the operation mode of the flying object and may increase or decrease the number of rotations of each of the stack cooling water pump 141 and the electric component cooling water pump 151 according to the temperature of the outside air within the determined range of the number of rotations.

The controller 160 may determine the range of the number of rotations according to the operation mode of the flying object and may decrease the number of rotations of each of the stack cooling water pump 141 and the electric component cooling water pump 151 within the determined range of the number of rotations as the temperature of the outside air decreases.

Meanwhile, the controller 160 may determine the range of the number of rotations according to the operation mode of the flying object and may increase the number of rotations of each of the stack cooling water pump 141 and the electric component cooling water pump 151 within the determined range of the number of rotations as the temperature of the outside air increases.

The operation mode of the flying object may include an initial start mode, an emergency operation mode, a normal operation mode, and a maximum output mode.

When the operation mode of the flying object is the initial start mode or the emergency operation mode, the controller 160 may switch the first stack cooling water valve 145 and the first electric component cooling water valve 153 to the open state and switch the second and third stack cooling water valves 146 and 147 and the second and third electric component cooling water valves 154 and 155 to the closed state.

In this case, the cooling water is introduced into the main radiator 110 through the first stack cooling water valve 145 and the first electric component cooling water valve 153, the controller 160 may rotate the cooling fan 111. Thus, the cooling water may dissipate the heat through the stack radiator STACK RAD and the electric component radiator ELEC RAD of the main radiator 110.

When the operation mode of the flying object is the normal operation mode, the controller 160 may switch the second and third stack cooling water valves 146 and 147 and the second and third electric component cooling water valves 154 and 155 to the open state and switch the first stack cooling water valve 145 and the first electric component cooling water valve 153 to the closed state.

In this case, when the cooling water is introduced into the stack radiators STACK RAD and the electric component radiators ELEC RAD of the first and second sub-radiators 120 and 130 through the second and third stack cooling water valves 146 and 147 and the second and third electric component cooling water valves 154 and 155, the controller 160 may stop the rotation of the cooling fan 111. Thus, the cooling water may dissipate the heat through the stack radiators STACK RAD and the electric component radiators ELEC RAD of the first and second sub-radiators 120 and 130.

When the operation mode of the flying object is in the maximum output mode, the controller 160 may switch the first to third stack cooling water valves 145, 146, and 147 and the first to third electric component cooling water valves 153, 154, and 155 to the open state.

In this case, the controller 160 may rotate the cooling fan 111, and the cooling water may dissipate the heat through the stack radiators STACK RAD and the electric component radiators ELEC RAD of the main radiator 110 and the first and second sub-radiators 120 and 130.

Figure 3:
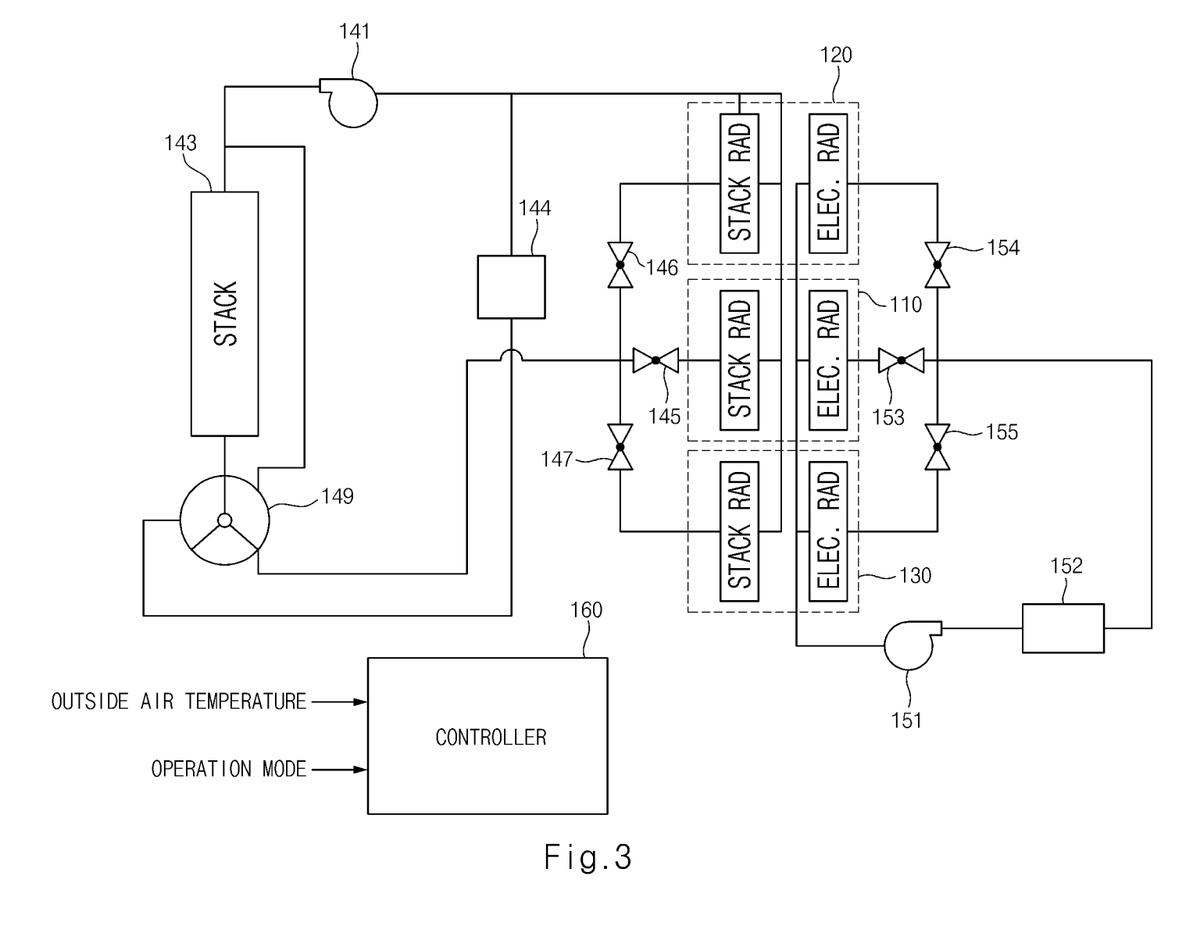
FIG. 3 is a view illustrating a configuration of a fuel cell system according to another embodiment of the present disclosure.

FIG. 3 is a view illustrating a configuration of a fuel cell system according to another embodiment of the present disclosure.

Referring to FIG. 3, a fuel cell system according to another embodiment of the present disclosure may include the main radiator 110, the first sub-radiator 120, the second sub-radiator 130, the stack cooling water pump 141, the fuel cell stack 143, the heater 144, the first to third stack cooling water valves 145, 146, and 147, a flow path switching valve 149, the electric component cooling water pump 151, the electric component 152, the first to third electric component cooling water valves 153, 154, and 155, and the controller 160.

The main radiator 110, the first sub-radiator 120, the second sub-radiator 130, the stack cooling water pump 141, the fuel cell stack 143, the heater 144, the first to third stack cooling water valves 145, 146, and 147, the electric component cooling water pump 151, the electric component 152, the first to third electric component cooling water valves 153, 154, and 155, and the controller 160, which are illustrated in FIG. 3, may be configurations that perform the same operations as those of the main radiator 110, the first sub-radiator 120, the second sub-radiator 130, the stack cooling water pump 141, the fuel cell stack 143, the heater 144, the first to third stack cooling water valves 145, 146, and 147, the electric component cooling water pump 151, the electric component 152, the first to third electric component cooling water valves 153, 154, and 155, and the controller 160, which are illustrated in FIG. 2. Thus, a detailed description of each configuration is substituted for the description of each component in FIG. 2.

The flow path switching valve 149 may perform the operations performed by the bypass valve 142 and the temperature control valve 148 of FIG. 2 under the control of the controller 160.

For example, the flow path switching valve 149 may, under the control of the controller 160, adjust the temperature of the cooling water introduced into the stack cooling water pump 141 by adjusting the amount of the cooling water passing through the main radiator 110 and the first and second sub-radiators 120 and 130 to introduce the cooling water to the stack cooling water pump 141 and by adjusting the amount of the cooling water passing through the heater 144 turned off without passing through the main radiator 110 and the first and second sub-radiators 120 and 130 to introduce the cooling water to the stack cooling water pump 141.

Further, the flow path switching valve 149 may control the flow path of the cooling water under the control of the controller 160 so that the cooling water circulates through one of the fuel cell stack 143 and the heater 144.

Figure 4:
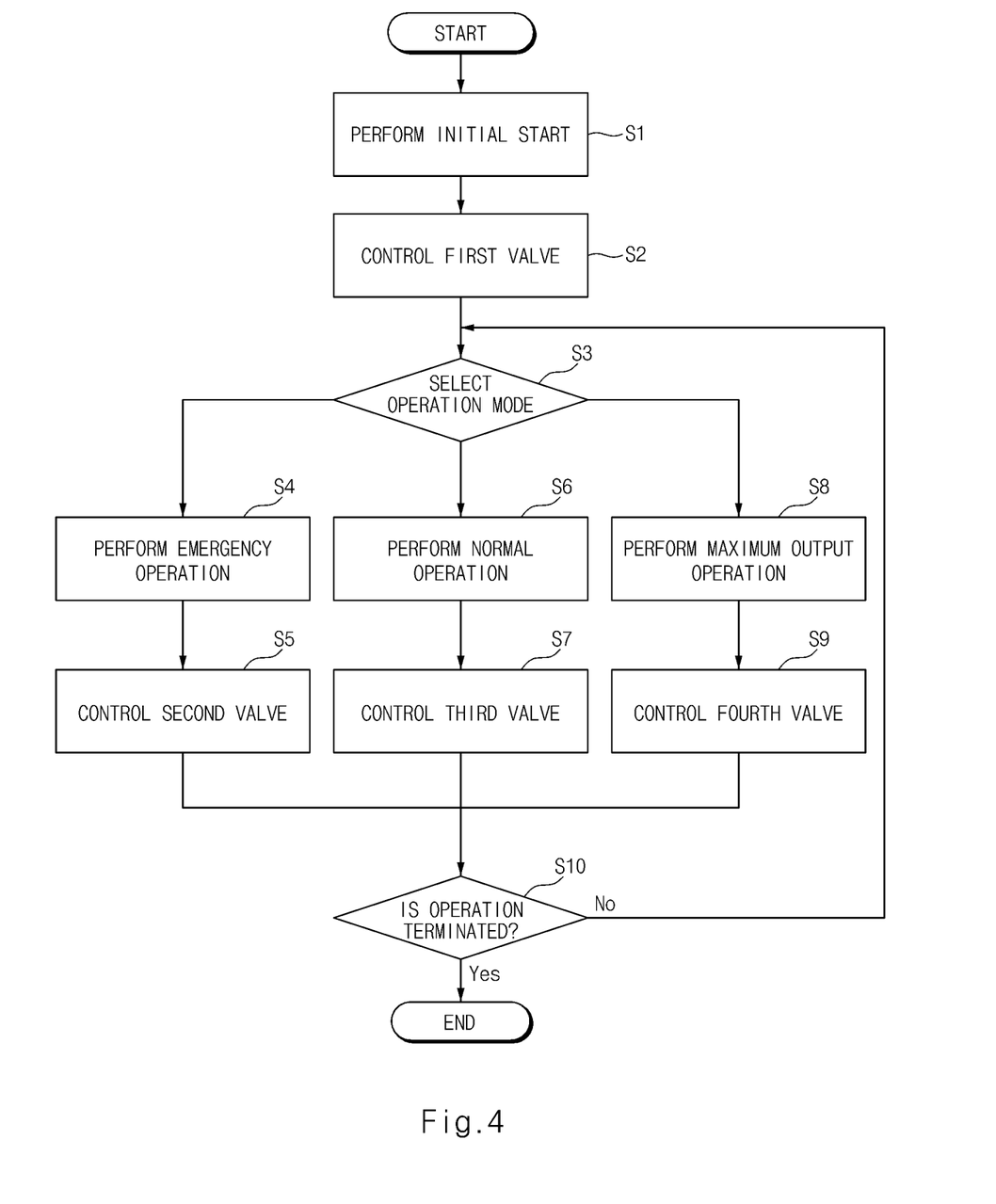
FIGS. 4 and 5 are flowcharts for describing a control operation for the fuel cell system according to the embodiment of the present disclosure.
Figure 5:
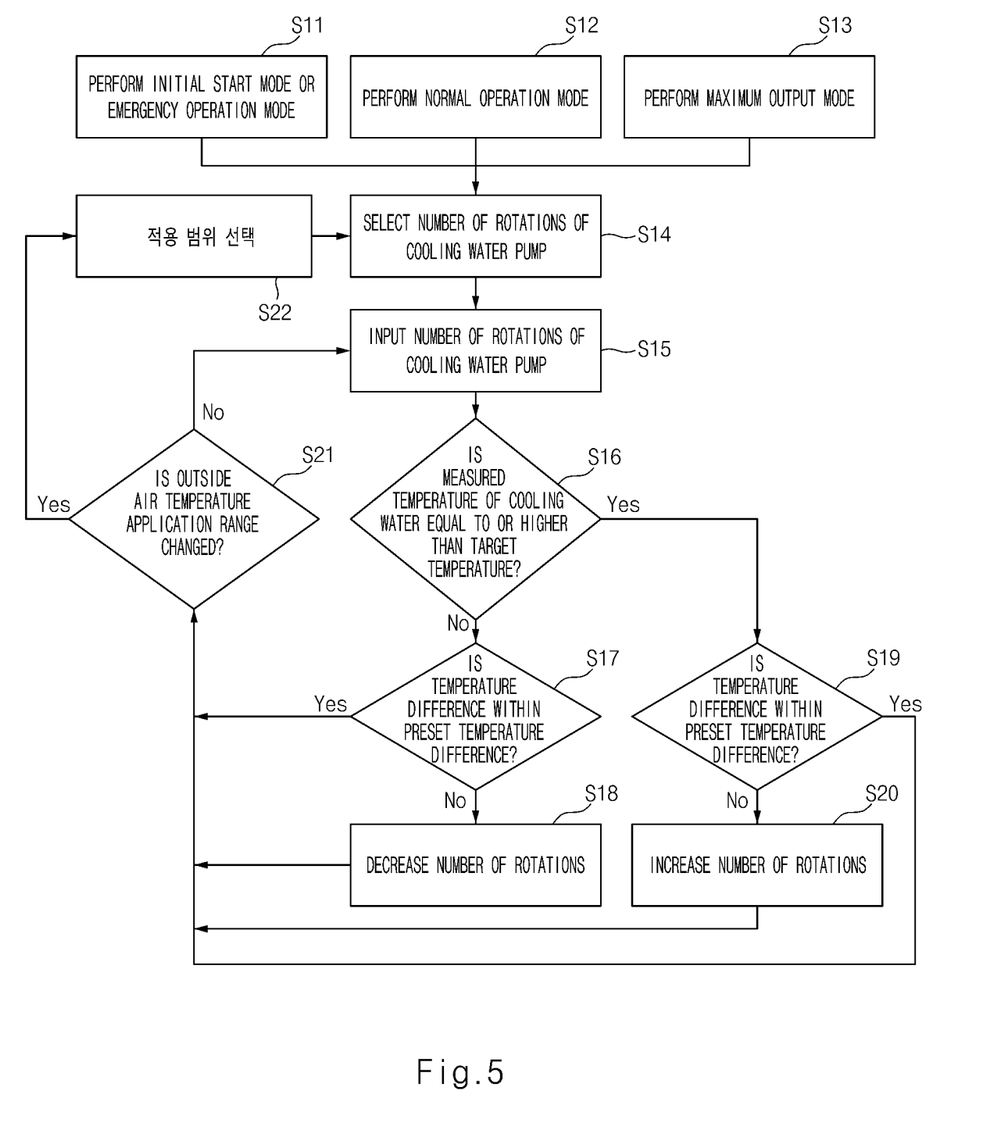

FIGS. 4 and 5 are flowcharts for describing a control operation for the fuel cell system according to the embodiment of the present disclosure.

In particular, FIG. 4 is a view for describing an operation which allows the cooling water to circulate through at least one of the main radiator 110, the first sub-radiator 120, and the second sub-radiator 130 according to the operation mode of the flying object.

Referring to FIG. 4, a method of controlling circulation of cooling water in a fuel cell system according to the embodiment of the present disclosure may include an initial start mode operation S1, a first valve control operation S2, an operation mode selection operation S3, an emergency operation mode application operation S4, a second valve control operation S5, a normal operation mode application operation S6, a third valve control operation S7, a maximum output operation mode application operation S8, a fourth valve control operation S9, and an operation termination determination operation S10.

The initial start mode operation S1 may be a mode selected when the flying object is started.

In this case, the fuel cell stack 143 may generate electric energy to supply the electric energy to the rotor of the flying object so as to rotate the rotor. The propeller wing 200 may be rotated by the rotation of the rotor, the downdraft may be formed by the rotation of the propeller wing 200, and thus the flying object may take off.

The first valve control operation S2 may include an operation in which, in the initial start mode, to stably manage the heat of the fuel cell stack 143 and the electric component 152, the first stack cooling water valve 145 and the first electric component cooling water valve 153 are switched to the open state so that the cooling water is provided to the stack radiator STACK RAD and the electric component radiator ELEC RAD of the main radiator 110, and an operation of operating the cooling fan 111.

The operation mode selection operation S3 may include an operation in which, after the initial start mode operation S1, one operation mode of the emergency operation mode S4, the normal operation mode S6, and the maximum output operation mode S8 is selected from an operator of the flying object or a system of the flying object.

When the emergency operation mode S4 is selected in the operation mode selection operation S3, the second valve control operation S5 may be performed.

Further, when the normal operation mode S6 is selected in the operation mode selection operation S3, the third valve control operation S7 may be performed.

Further, when the maximum output operation mode S8 is selected in the operation mode selection operation S3, the fourth valve control operation S9 may be performed.

The second valve control operation S5 may include an operation in which, in the emergency operation mode, to stably manage the heat of the fuel cell stack 143 and the electric component 152, the first stack cooling water valve 145 and the first electric component cooling water valve 153 are switched to the open state so that the cooling water is provided to the stack radiator STACK RAD and the electric component radiator ELEC RAD of the main radiator 110, and an operation of operating the cooling fan 111.

The third valve control operation S7 may include an operation in which, in the normal operation mode, the second and third stack cooling water valves 146 and 147 and the second and third electric component cooling water valves 154 and 155 are switched to the open state so that the cooling water is provided to the first and second sub-radiators 120 and 130. In this case, the stack radiators STACK RAD and the electric component radiators ELEC RAD of the first and second sub-radiators 120 and 130 may dissipate the heat of the cooling water using the downdraft caused by the rotation of the propeller wing 200.

The fourth valve control operation S9 may include an operation in mode which, in the maximum output operation mode, all of the first to third stack cooling water valves 145, 146 and 147 and the first to third electric component cooling water valves 153, 154 and 155 are switched to the open state so that the cooling water may be provided to the main radiator 110 and the first and second sub-radiators 120 and 130, and an operation of operating the cooling fan 111.

In the fourth valve control operation S9, during the maximum output operation mode, the cooling water may be provided to all of the radiators 110, 120, and 130 so that the heat of the fuel cell stack 143 and the electric component 152 is dissipated to the maximum.

After one operation among the second to fourth valve control operations S5, S7, and S9 is performed, the operation termination determination operation S10 may be performed.

The operation termination determination operation S10 may include an operation of determining whether or not the operation of the flying object is terminated.

When it is determined in the operation termination determination operation S10 that the operation of the flying object is not terminated (No), the operation mode selection operation S3 may be performed again.

Meanwhile, when it is determined in the operation termination determination operation S10 that the operation of the flying object is terminated (Yes), the method of controlling circulation of cooling water in a fuel cell system according to the embodiment of the present disclosure may be terminated.

FIG. 5 illustrates a method of controlling a cooling water pump in a fuel cell system on the basis of the operation mode of the flying object and the temperature of the outside air (outdoor air).

In this case, FIG. 5 may be a method of controlling a circulation speed of the cooling water by controlling the number of rotations of the cooling water pump according to the operation mode of the flying object and an outside air temperature.

It may be understood that the cooling water pump includes the stack cooling water pump 141 and the electric component cooling water pump 151 illustrated in FIG. 2.

TABLE 1

| Temperature application range | | Temp < A1 | A1 < Temp < A2 | . . . | Temp > An |
|---|---|---|---|---|---|
| Operation mode | Initial start or emergency operation | B0 | B1 | . . . | Max |
| | Normal operation | C0 | C1 | . . . | Max |
| | Maximum output operation | D0 | D1 | . . . | Max |

Table 1 may show an initial selection value of the number of rotations of the cooling water pump according to the temperature of the outside air and the operation mode of the flying object.

In this case, the numbers of rotations of the stack cooling water pump 141 and the electric component cooling water pump 151 according to each operation mode may be different from each other.

For example, when an outside air temperature Temp is lower than A1, in the initial start mode or the emergency operation mode, the initial number of rotations of the cooling water pump may be set to B0, in the normal operation mode, the initial number of rotations of the cooling water pump may be set to C0, and in the maximum output operation, the initial number of rotations of the cooling water pump may be set to D0.

Further, when the outside air temperature Temp is higher than A1 and lower than A2, in the initial start mode or the emergency operation mode, the initial number of rotations of the cooling water pump may be set to B1, in the normal operation mode, the initial number of rotations of the cooling water pump may be set to C1, and in the maximum output operation, the initial number of rotations of the cooling water pump may be set to D1.

Further, when the outside air temperature Temp is higher than An, in the initial start mode or the emergency operation mode, the normal operation mode, and the maximum output operation mode, the initial number of rotations of the cooling water pump may be set to a maximum value Max.

In this case, as the outside air temperature Temp becomes larger, the initial number of rotations of the cooling water pump in each operation mode may be increased.

That is, B1 may have a value higher than that of B0, C1 may have a value higher than that of C0, and D1 may have a value higher than that of D0.

Referring to Table 1 and FIG. 5, a method of controlling a cooling water pump of a fuel cell system according to the embodiment of the present disclosure will be described as follows.

The method of controlling a cooling water pump of a fuel cell system according to the embodiment of the present disclosure may include an initial start mode or emergency operation mode selection operation S11, a normal operation mode selection operation S12, a maximum output mode selection operation S13, a cooling water pump rotation number selection operation S14, a cooling water pump rotation number input operation S15, a temperature comparison operation S16, a first temperature difference determination operation S17, a rotation number decrease operation S18, a second temperature difference determination operation S19, a rotation number increase operation S20, an outside air temperature application range change determination operation S21, and an application range selection operation S22.

One operation mode may be selected from the initial start mode or emergency operation mode selection operation S11, the normal operation mode selection operation S12, and the maximum output mode selection operation S13.

The cooling water pump rotation number selection operation S14 may include an operation of selecting the initial number of rotations of the cooling water pump according to the selected operation mode.

Referring to Table 1, in the cooling water pump rotation number selection operation S14, one value may be selected from values in Table 1 according to the selected operation mode.

The cooling water pump rotation number input operation S15 may be an operation in which the one value selected from the values in Table 1 is set to the initial number of rotations of the cooling water pump.

In this case, when the initial number of rotations of the cooling water pump is set, the cooling water pump may be operated at the set initial number of rotations.

The temperature comparison operation S16 may include an operation of determining whether the measured temperature of the cooling water is higher than a target temperature.

In this case, the measured temperature of the cooling water may be obtained by measuring the temperature of the cooling water flowing into the fuel cell stack 143.

In the temperature comparison operation S16, when the measured temperature of the cooling water is not higher than the target temperature (No), the first temperature difference determination operation S17 may be performed.

Meanwhile, in the temperature comparison operation S16, when the measured temperature of the cooling water is higher than the target temperature (Yes), the second temperature difference determination operation S19 may be performed.

The first temperature difference determination operation S17 may include an operation of determining whether a difference between the measured temperature of the cooling water and the target temperature is within a preset temperature difference.

In the first temperature difference determination operation S17, when the difference between the measured temperature of the cooling water and the target temperature is within the preset temperature difference (Yes), the outside air temperature application range change determination operation S21 may be performed.

Meanwhile, in the first temperature difference determination operation S17, when the difference between the measured temperature of the cooling water and the target temperature is not within the preset temperature difference (No), the rotation number decrease operation S18 may be performed.

The rotation number decrease operation S18 may include an operation of decreasing the number of rotations of the cooling water pump. After the rotation number decrease operation S18 is performed, the outside air temperature application range change determination operation S21.

That is, when the measured temperature of the cooling water is not higher than the target temperature, and when the difference between the measured temperature of the cooling water and the target temperature is within the preset temperature difference, the outside air temperature application range change determination operation S21 may be performed.

Meanwhile, when the measured temperature of the cooling water is not higher than the target temperature, and when the difference between the measured temperature of the cooling water and the target temperature is not within the preset temperature difference (when the difference is higher than the preset temperature difference), after the number of rotations of the cooling water pump is decreased, the outside air temperature application range change determination operation S21 may be performed.

The second temperature difference determination operation S19 may include an operation of determining whether a difference between the measured temperature of the cooling water and the target temperature is within the preset temperature difference in a state in which the measured temperature of the cooling water is higher than the target temperature.

In the second temperature difference determination operation S19, when the difference between the measured temperature of the cooling water and the target temperature is within the preset temperature difference (Yes), the outside air temperature application range change determination operation S21 may be performed.

Meanwhile, in the second temperature difference determination operation S19, when the difference between the measured temperature of the cooling water and the target temperature is not within the preset temperature difference (No, when the difference is higher than the preset temperature difference), the rotation number increase operation S20 may be performed.

The rotation number increase operation S20 may include an operation of increasing the number of rotations of the cooling water pump.

That is, when the temperature of the cooling water is higher than the target temperature by the preset temperature difference or more, after the number of rotations of the cooling water pump is increased, the outside air temperature application range change determination operation S21 may be performed.

Meanwhile, when the temperature of the cooling water is higher than the target temperature by less than the preset temperature difference, the outside air temperature application range change determination operation S21 may be performed.

As a result, in the method of controlling a cooling water pump of a fuel cell system according to the embodiment of the present disclosure, when the difference between the measured temperature of the cooling water and the target temperature is equal to or higher than the preset temperature difference after the initial number of rotations of the cooling water pump is set by the operation mode, the outside air temperature application range change determination operation S21 may be performed after the number of rotations of the cooling water pump is increased or decreased.

Further, in the method of controlling a cooling water pump of a fuel cell system according to the embodiment of the present disclosure, when the difference between the measured temperature of the cooling water and the target temperature is within the preset temperature difference after the initial number of rotations of the cooling water pump is set by the operation mode, the number of rotations of the cooling water pump is not increased or decreased, and the outside air temperature application range change determination operation S21 may be performed.

The outside air temperature application range change determination operation S21 may include an operation of determining whether the measured outside air temperature Temp deviates from a currently selected temperature section among a temperature section shown in Table 1.

In the outside air temperature application range change determination operation S21, when the measured outside air temperature deviates from the selected temperature section (Yes), the application range selection operation S22 may be performed in which the temperature section is selected according to the measured outside air temperature.

Meanwhile, in the outside air temperature application range change determination operation S21, when the measured outside air temperature does not deviate from the selected temperature section (No), the cooling water pump rotation number input operation S15 may be performed in which the initial number of rotations of the cooling water pump is maintained.

As described above, in the method of controlling a cooling water pump of a fuel cell system according to the embodiment of the present disclosure, the number of rotations of the cooling water pump is controlled on the basis of the operation mode and the outside air temperature, and thus thermal management efficiency of the fuel cell system may be increased, and power consumption required for thermal management may be minimized.

The present technology has an advantage in that heat generated in a fuel cell system used in a flying object may be efficiently dissipated.

In addition, various effects directly or indirectly identified though the present document may be provided.

The above description is merely illustrative of the technical spirit of the present disclosure, and those skilled in the art to which the present disclosure belongs may make various modifications and changes without departing from the essential features of the present disclosure.

Thus, the embodiments disclosed in the present disclosure are not intended to limit the technology spirit of the present disclosure, but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. A fuel cell system, comprising:
   a propeller wing of a flying object connected to a rotor;
   a main radiator and a sub-radiator configured to dissipate heat of cooling water by a downdraft generated by rotation of the propeller wing; and
   a controller configured to provide the cooling water to one or both of the main radiator and the sub-radiator based on an operation mode of the flying object.

2. The fuel cell system of claim 1, wherein the operation mode of the flying object includes an initial start mode, an emergency operation mode, a normal operation mode, and a maximum output mode, and     wherein the controller is configured to:

provide the cooling water to the main radiator in the initial start mode and the emergency operation mode,         provide the cooling water to the sub-radiator in the normal operation mode, and         provide the cooling water to the main radiator and the sub-radiator in the maximum output mode.

3. The fuel cell system of claim 2, further comprising:

a first cooling water valve configured to transmit the cooling water to the main radiator or block the cooling water from being transmitted to the main radiator; and     a second cooling water valve configured to transmit the cooling water to the sub-radiator or block the cooling water from being transmitted to the sub-radiator.

4. The fuel cell system of claim 3, wherein the controller is configured to switch the first cooling water valve to an open state and to switch the second cooling water valve to a closed state in the initial start mode or the emergency operation mode.

5. The fuel cell system of claim 3, wherein the controller is configured to switch the first cooling water valve to a closed state and to switch the second cooling water valve to an open state in the normal operation mode.

6. The fuel cell system of claim 3, wherein the controller is configured to switch the first cooling water valve and the second cooling water valve to an open state in the maximum output mode.

7. The fuel cell system of claim 1, further comprising:

a cooling water pump configured to allow the cooling water to circulate,     wherein the controller is configured to control a number of rotations of the cooling water pump based on an outside air temperature.

8. The fuel cell system of claim 7, wherein the controller is configured to increase the number of rotations of the cooling water pump as the outside air temperature increases and to decrease the number of rotations of the cooling water pump as the outside air temperature decreases.

9. The fuel cell system of claim 1, wherein the cooling water circulates in one or both of the main radiator and the sub-radiator through a temperature control valve, a stack cooling water pump, a bypass valve, and a fuel cell stack.

10. The fuel cell system of claim 1, wherein the cooling water circulates in one or both of the main radiator and the sub-radiator through a stack cooling water pump, a fuel cell stack, and a flow path switching valve.

\* \* \* \* \*